UNITED STATES PATENT OFFICE.

PETER BERGELL, OF BERLIN, GERMANY, ASSIGNOR TO ACTIEN GESELLSCHAFT FÜR ANILIN FABRIKATION, OF BERLIN, GERMANY.

BROMO-LECITHIN AND PROCESS OF MAKING SAME.

No. 803,541.      Specification of Letters Patent.      Patented Nov. 7, 1905.

Application filed July 28, 1904. Serial No. 218,534. (Specimens.)

*To all whom it may concern:*

Be it known that I, PETER BERGELL, of Berlin, in the Kingdom of Prussia, German Empire, have invented new and useful Improvements in Bromo-Lecithin and Process for Its Manufacture; and I do hereby declare that the following is a full, clear, and exact description thereof, which will enable others skilled in the art to which it appertains to make and use the same.

This invention relates to the manufacture of new halogen derivatives of lecithin, which may be obtained by treating lecithin, preferably in a chloroformic solution, with bromin. These new compounds are of great value for threapeutical purposes because they combine the effect of bromin as a tonic remedy with that of lecithin as a nutritive preparation, the more so as the bromin derivatives, unlike lecithin itself, are not easily changed by the action of the digestive organs, so that the greater part of the bromo-lecithin is resorbed as such and not in the form of the products of its decomposition. In using these new halogen derivatives as medicine the approximate dose should be 0.1 gram several times a day.

I have found that the different commercial lecithins show a different capacity for absorbing or being incorporated with bromin, so that the highest proportion of bromin absorbed is about fifty per cent. of the weight of the lecithin.

In order to carry out my process practically, I can, for instance, proceed as follows, the parts being by weight: A solution of ten parts lecithin derived from the yolk of eggs in fifty parts of chloroform is treated with about two and one-half parts of bromin. The temperature of the mixture is preferably kept below 30° centigrade by cooling, the process producing heat and a higher temperature, changing the yield and the properties of the resulting product. The product of the reaction is allowed to stand for a short time and then dried under vacuum. The bromo-lecithin thus obtained represents a nearly colorless mass resembling wax, soluble in chloroform, alcohol, and ether, sparely soluble in acetone, hardly soluble in water, being easily saponified when heated with alcoholic soda-lye. It melts above 100° centigrade with decomposition.

The underlying principle of the invention having been set forth in the above description, it is obvious that the proportions of the ingredients used may be altered within certain limits without deviating from the principle of this invention, as I have stated above that different kinds of lecithin show a different capacity for absorbing bromin. Furthermore, the result of my process is not materially changed if the treating with bromin is carried out without addition of a solvent.

Now what I claim is—

1. The process of manufacturing bromo-lecithin which consists in treating lecithin with bromin at a moderate temperature.

2. The new bromo-lecithin being a nearly colorless mass, resembling wax, soluble in chloroform, alcohol and ether, sparely soluble in acetone, hardly soluble in water, being easily saponified when heated with alcoholic soda-lye and which is split up less readily than lecithin by the action of the digestive organs of the human body.

In witness whereof I have hereunto signed my name this 8th day of July, 1904, in the presence of two subscribing witnesses.

PETER BERGELL.

Witnesses:
     HENRY HASPER,
     WOLDEMAR HAUPT.